United States Patent
Boca et al.

(10) Patent No.: US 7,957,583 B2
(45) Date of Patent: Jun. 7, 2011

(54) SYSTEM AND METHOD OF THREE-DIMENSIONAL POSE ESTIMATION

(75) Inventors: Remus F. Boca, North Vancouver (CA); Jeffrey Scott Beis, North Vancouver (CA); Simona Liliana Pescaru, Vancouver (CA)

(73) Assignee: RoboticVISIONTech LLC, Great Falls, VA (US)

( * ) Notice: Subject to any disclaimer, the term of this patent is extended or adjusted under 35 U.S.C. 154(b) by 978 days.

(21) Appl. No.: 11/833,187

(22) Filed: Aug. 2, 2007

(65) Prior Publication Data
US 2009/0033655 A1 Feb. 5, 2009

(51) Int. Cl.
*G06K 9/00* (2006.01)
*G06T 15/00* (2011.01)

(52) U.S. Cl. .. 382/154; 382/100; 345/419; 348/E13.002

(58) Field of Classification Search .................. 382/154, 382/153, 131, 100, 242, 238, 203, 232, 128, 382/181, 190, 195; 345/419, 163; 700/245; 359/9, 22, 23; 348/E13.014, E13.019, E13.023, 348/E13.025, E13.033, E13.04, E13.044, 348/E13.059, E13.067, E13.071, E13.072, 348/E13.073, E13.038

See application file for complete search history.

(56) References Cited

U.S. PATENT DOCUMENTS

| | | | |
|---|---|---|---|
| 3,986,007 A | 10/1976 | Ruoff, Jr. .................... 235/151.1 |
| 4,011,437 A | 3/1977 | Hohn | |
| 4,146,924 A | 3/1979 | Birk et al. ...................... 364/513 |
| 4,187,454 A | 2/1980 | Ito et al. | |
| 4,219,847 A | 8/1980 | Pinkney et al. ................ 358/126 |
| 4,294,544 A | 10/1981 | Altschuler et al. ............ 356/376 |
| 4,305,130 A | 12/1981 | Kelley et al. ................... 364/513 |
| 4,334,241 A | 6/1982 | Kashioka et al. .............. 358/107 |
| 4,402,053 A | 8/1983 | Kelley et al. ................... 364/513 |
| 4,437,114 A | 3/1984 | LaRussa ........................ 358/101 |
| 4,523,809 A | 6/1985 | Taboada et al. ................ 350/163 |
| 4,578,561 A | 3/1986 | Corby, Jr. et al. ......... 219/124.34 |
| 4,613,942 A | 9/1986 | Chen ............................. 364/513 |

(Continued)

FOREIGN PATENT DOCUMENTS
DE 102 36 040 A1 2/2004
(Continued)

OTHER PUBLICATIONS

U.S. Appl. 11/754,218, filed May 25, 2007, Habibi et al.*
(Continued)

*Primary Examiner* — Sheela C Chawan
(74) *Attorney, Agent, or Firm* — Seed IP Law Group PLLC

(57) ABSTRACT

A system and method for identifying objects using a machine-vision based system are disclosed. Briefly described, one embodiment is a method that captures a first image of at least one object with an image capture device, processes the first captured image to find an object region based on a reference two-dimensional model and determines a three-dimensional pose estimation based on a reference three-dimensional model that corresponds to the reference two-dimensional model and a runtime three-dimensional representation of the object region where a point-to-point relationship between the reference three-dimensional models of the object and the runtime three-dimensional representation of the object region is not necessarily previously known. Thus, two-dimensional information or data is used to segment an image and three-dimensional information or data used to perform three-dimensional pose estimation on a segment of the image.

37 Claims, 10 Drawing Sheets

U.S. PATENT DOCUMENTS

| | | | |
|---|---|---|---|
| 4,654,949 A | 4/1987 | Pryor | 29/407 |
| 4,687,325 A | 8/1987 | Corby, Jr. | 356/1 |
| 4,791,482 A | 12/1988 | Barry et al. | 358/107 |
| 4,835,450 A | 5/1989 | Suzuki | 318/568.13 |
| 4,879,664 A | 11/1989 | Suyama et al. | 364/518 |
| 4,942,539 A | 7/1990 | McGee et al. | 364/513 |
| 4,985,846 A | 1/1991 | Fallon | 364/513 |
| 5,083,073 A | 1/1992 | Kato | 318/577 |
| 5,160,977 A | 11/1992 | Utsumi | 356/376 |
| 5,208,763 A | 5/1993 | Hong et al. | 364/551.02 |
| 5,212,738 A | 5/1993 | Chande et al. | 382/8 |
| 5,325,468 A | 6/1994 | Terasaki et al. | 395/97 |
| 5,350,269 A | 9/1994 | Azuma et al. | 414/416 |
| 5,446,835 A | 8/1995 | Iida et al. | 395/133 |
| 5,454,775 A | 10/1995 | Cullen et al. | 483/16 |
| 5,461,478 A | 10/1995 | Sakakibara et al. | 356/375 |
| 5,499,306 A | 3/1996 | Sasaki et al. | 382/291 |
| 5,523,663 A | 6/1996 | Tsuge et al. | |
| 5,568,593 A | 10/1996 | Demarest et al. | 395/82 |
| 5,579,444 A | 11/1996 | Dalziel et al. | |
| 5,608,818 A | 3/1997 | Chini et al. | 382/153 |
| 5,696,673 A | 12/1997 | Pryor | 364/167.01 |
| 5,715,166 A | 2/1998 | Besl et al. | 364/474.24 |
| 5,784,282 A | 7/1998 | Abitbol et al. | 364/474.28 |
| 5,802,201 A | 9/1998 | Nayar et al. | 382/153 |
| 5,870,527 A | 2/1999 | Fujikawa et al. | 395/80 |
| 5,956,417 A | 9/1999 | Pryor | 382/154 |
| 5,959,425 A | 9/1999 | Bieman et al. | 318/568.15 |
| 5,974,169 A | 10/1999 | Bachelder | 382/151 |
| 5,978,521 A | 11/1999 | Wallack et al. | 382/294 |
| 5,988,862 A * | 11/1999 | Kacyra et al. | 703/6 |
| 6,004,016 A | 12/1999 | Spector | 364/167.02 |
| 6,044,183 A | 3/2000 | Pryor | 382/287 |
| 6,064,759 A | 5/2000 | Buckley et al. | 382/154 |
| 6,115,480 A | 9/2000 | Washizawa | 382/103 |
| 6,141,863 A | 11/2000 | Hara et al. | 29/714 |
| 6,167,607 B1 | 1/2001 | Pryor | 29/407.04 |
| 6,211,506 B1 | 4/2001 | Pryor et al. | 250/208.1 |
| 6,236,896 B1 | 5/2001 | Watanabe et al. | 700/37 |
| 6,246,468 B1 | 6/2001 | Dimsdale | |
| 6,301,763 B1 | 10/2001 | Pryor | 29/407.04 |
| 6,341,246 B1 | 1/2002 | Gerstenberger et al. | 700/245 |
| 6,392,744 B1 | 5/2002 | Holec | 356/4.03 |
| 6,424,885 B1 | 7/2002 | Niemeyer et al. | |
| 6,463,358 B1 | 10/2002 | Watanabe et al. | 700/253 |
| 6,466,843 B1 | 10/2002 | Bonanni et al. | 700/245 |
| 6,490,369 B1 | 12/2002 | Beiman | 382/153 |
| 6,516,092 B1 | 2/2003 | Bachelder et al. | 382/181 |
| 6,529,627 B1 | 3/2003 | Callari et al. | 382/154 |
| 6,549,288 B1 | 4/2003 | Migdal et al. | 356/603 |
| 6,580,971 B2 | 6/2003 | Bunn et al. | 700/259 |
| 6,594,600 B1 | 7/2003 | Arnoul et al. | 702/94 |
| 6,628,819 B1 * | 9/2003 | Huang et al. | 382/154 |
| 6,721,444 B1 | 4/2004 | Gu et al. | 382/154 |
| 6,724,930 B1 | 4/2004 | Kosaka et al. | 382/154 |
| 6,741,363 B1 | 5/2004 | Kaupert | 356/602 |
| 6,748,104 B1 | 6/2004 | Bachelder et al. | 382/151 |
| 6,754,560 B2 | 6/2004 | Fujita et al. | 700/245 |
| 6,804,416 B1 | 10/2004 | Bachelder et al. | 382/294 |
| 6,816,755 B2 | 11/2004 | Habibi et al. | 700/259 |
| 6,836,702 B1 | 12/2004 | Brogårdh et al. | 700/245 |
| 6,841,780 B2 | 1/2005 | Cofer et al. | |
| 6,898,484 B2 * | 5/2005 | Lemelson et al. | 700/245 |
| 6,970,802 B2 | 11/2005 | Ban et al. | 702/153 |
| 7,006,236 B2 | 2/2006 | Tomasi et al. | 356/614 |
| 7,009,717 B2 * | 3/2006 | Van Coppenolle et al. | 356/603 |
| 7,061,628 B2 * | 6/2006 | Franke et al. | 356/604 |
| 7,084,900 B1 * | 8/2006 | Watanabe et al. | 348/94 |
| 7,087,049 B2 | 8/2006 | Nowlin et al. | |
| 7,177,459 B1 * | 2/2007 | Watanabe et al. | 382/151 |
| 7,181,083 B2 | 2/2007 | Dell'Eva | |
| 7,233,841 B2 | 6/2007 | Sadighi et al. | |
| 7,336,814 B2 * | 2/2008 | Boca et al. | 382/141 |
| 7,627,395 B2 | 12/2009 | Sadighi et al. | |
| 7,657,065 B2 * | 2/2010 | Kotake et al. | 382/106 |
| 7,742,635 B2 * | 6/2010 | Rohaly et al. | 382/154 |
| 2003/0004694 A1 * | 1/2003 | Aliaga et al. | 703/2 |
| 2003/0007159 A1 * | 1/2003 | Franke et al. | 356/604 |
| 2004/0037689 A1 * | 2/2004 | Watanabe et al. | 414/730 |
| 2004/0041808 A1 * | 3/2004 | Ban et al. | 345/419 |
| 2004/0081352 A1 * | 4/2004 | Ban et al. | 382/154 |
| 2004/0114033 A1 * | 6/2004 | Eian et al. | 348/42 |
| 2004/0172164 A1 * | 9/2004 | Habibi et al. | 700/245 |
| 2004/0193321 A1 * | 9/2004 | Anfindsen et al. | 700/257 |
| 2005/0002555 A1 * | 1/2005 | Kumiya et al. | 382/153 |
| 2006/0088203 A1 * | 4/2006 | Boca et al. | 382/153 |
| 2007/0073439 A1 * | 3/2007 | Habibi et al. | 700/213 |

FOREIGN PATENT DOCUMENTS

| | | |
|---|---|---|
| EP | 0 114 505 A1 | 8/1984 |
| EP | 0 151 417 A1 | 8/1985 |
| EP | 0 493 612 A1 | 7/1992 |
| EP | 0 763 406 B1 | 3/1997 |
| EP | 0 911 603 B1 | 4/1999 |
| EP | 0 951 968 A2 | 10/1999 |
| EP | 1 043 126 A2 | 10/2000 |
| EP | 1 043 642 A2 | 10/2000 |
| EP | 1 043 689 A2 | 10/2000 |
| EP | 1 484 716 A1 | 12/2004 |
| JP | 63288683 A | 11/1988 |
| JP | 01-124072 A | 5/1989 |
| JP | 2000024973 A2 | 1/2000 |
| WO | 2005/074653 A2 | 8/2005 |

OTHER PUBLICATIONS

U.S. Appl. No. 11/779,812, filed Jul. 18, 2007, Habibi.*
U.S. Appl. No. 11/857,680, filed Sep. 19, 2007, Boca et al.*
U.S. Appl. No. 60/413,180, filed Sep. 23, 2002, Eian et al.*
U.S. Appl. No. 60/587,488, filed Jul. 14, 2004, Boca et al.*
U.S. Appl. No. 60/808,903, filed May 25, 2006, Habibi et al.*
U.S. Appl. No. 60/845,932, filed Sep. 19, 2006, Boca et al.*
U.S. Appl. No. 60/875,073, filed Dec. 16, 2006, Beis et al.*
"3D Robot Guidance with a Single Camera," *ISRA Vision Systems AG*, pp. 83-105. (No date available).
"3D Vision with One Camera," URL=http://neu1.isravision.com/likecms/index.php?site=site.html&dir=isra&nav=162, download date Apr. 12, 2005.
Aloimonos, J., et al., "Active Vision," *IEEE*, pp. 35-54, 1987.
Bajcsy, R., "Active Perception," *Proc. IEEE* 76(8):996-1005, 1988.
Bakhtari, A., et al., "Active-Vision-based Multi-Sensor Surveillance—An Implementation," *IEEE Transactions on Systems, Man, and Cybernetics, Part C: Applications and Reviews*, 36(5):668-680, Sep. 2006.
Bejczy, A. K., "Challenges of Human-Robot Communication in Telerobotics," *IEEE International Workshop on Robot and Human Communication*, pp. 1-8, 1996.
Borotschnig, H., et al., "Active Object Recognition in Parametric Eigenspace," *Proc. 9th British Machine Vision Conference*, pp. 629-638, 1998.
Borotschnig, H., et al., "Appearance-Based Active Object Recognition," *Image and Vision Computing* 18:715-727, 2000.
Bouthemy, P., "A Maximum Likelihood Framework for Determining Moving Edges," *IEEE Trans. Pattern Analysis and Machine Intelligence* 11(5):499-511, 1989.
Brown, M., et al., "3D Model Acquisition by Tracking 2D Wireframes," *Proc. 11th British Machine Vision Conference*, pp. 656-665, 2000.
Callari F., et al., "Active Recognition: Using Uncertainty to Reduce Ambiguity," *Proc. 13th International Conference on Pattern Recognition*, pp. 925-929, 1996.
Chaumette, F., "Potential Problems of Stability and Convergence in Image-Based and Position-Based Visual Servoing," in D. Kriegman, G. Hager and A. Morse, editors, *The Confluence of Vision and Control*, vol. 237 of Lecture Notes in Control and Information Sciences, pp. 66-78, Springer-Verlag, 1998.
Chaumette, F., et al., "Structure from Controlled Motion," *IEEE Trans. Pattern Analysis and Machine Intelligence* 18(5):492-508, May 1996.
Chen, L., et al., "An Investigation on the Accuracy of Three-Dimensional Space Reconstruction using the Direct Linear Transformation Technique," *J. Biomechanics* 27(4):493-500, 1994.

Constantinescu, D., et al., "Smooth and Time-Optimal Trajectory Planning for Industrial Manipulators along Specified Paths," *Journal of Robotic Systems* 17(5):233-249, 2000.

Corke, P.I., et al., "A New Partitioned Approach to Image-Based Visual Servo Control," *IEEE Trans. On Robotics and Automation* 17(4):507-515, Aug. 2001.

Deguchi, K., "Optimal Motion Control for Image-Based Visual Servoing by Decoupling Translation and Rotation," in *Proc. Int. Conf on Intelligent Robots and Systems*, pp. 705-711, Oct. 1998.

Denzler J. et al., "Learning, Tracking and Recognition of 3D Objects," *Proceedings of the IEEE/RSJ/GI, International Conference on Intelligent Robots and Systems (IROS)* 1:89-96, 1994.

Drummond, T., et al., "Real-time Tracking of Complex Structures with On-line Camera Calibration," *Proceedings of British Machine Vision Conference*, pp. 574-583, 1999.

Eriksen, R.D., et al., "Classification and pose estimation of unconstrained 3D objects," *34th International Symposium on Robotics*, Jun. 2-5, 2003, 7 pages.

Hartley et al., *Multiple View Geometry in Computer Vision*, Cambridge University Press, Cambridge, 2000.

Huang, T., et al., "Uniqueness of 3D Pose Under Weak Perspective: A Geometrical Proof," *IEEE Transactions on Pattern Analysis and Machine Intelligence* 17(12):1220-1221, Dec. 1995.

Hutchinson, S.A., et al., "Planning Sensing Strategies in a Robot Work Cell with Multi-Sensor Capabilities," *IEEE Trans. on Robotics and Automation* 5(6):765-783, 1989.

Ji, Q., et al., "An Integrated Linear Technique for Pose Estimation from different Geometric Features," *International Journal of Pattern Recognition and Artificial Intelligence*, 13(5):705-733, Aug. 1999.

Jia, Y-B., et al., "Sensing Polygon Poses by Inscription," in *Proc. of 1994 IEEE International Conference on Robotics and Automation*, pp. 1642-1649, May 1994.

Kim, W., "Computer Vision Assisted Virtual Reality Calibration," URL=http://www.robotics.jpl.nasa.gov/publications/Won_Kim/ra98_vrc.pdf., pp. 1-14, 1999.

Kovačič, S., et al., "Planning Sequences of Views for 3-D Object Recognition and Pose Determination," *Pattern Recognition* 31(10):1407-1417, 1998.

Liu, Y., et al., "Determination of Camera Location from 2D to 3D Line and Point Correspondences," *IEEE Transactions on Pattern Analysis and Machine Intelligence* 12(1):82-88, 1988.

Lowe, D.G., "Robust Model-based Motion Tracking Through the Integration of Search and Estimation," *International Journal of Computer Vision* 8(2):113-122, 1992.

Lu, C-P., et al., "Fast and Globally Convergent Pose Estimation from Video Images," written Feb. 18, 1998, Published in *IEEE*, Jun. 2000, 26 pages.

Macfarlane, S., et al., "Jerk-Bounded Manipulator Trajectory Planning: Design for Real-Time Applications," *IEEE Trans. on Robotics and Automation* 19(1):42-52, 2003.

Meyer, W., "One-Eyed Robots With 3D Vision," *ISRA Vision Systems AG*, Press News, Release No. 16, Jun. 15, 2004, pp. 1-7.

Miura, J., et al., "Task-Oriented Generation of Visual Sensing Strategies in Assembly Tasks," CMU School of Computer Science Tech Report CMU-CS-95-116, 42 pages, 1995.

Motai, Y., et al., "Concatenate Feature Extraction for Robust 3D Elliptic Object Localization," *Proc. Of the 19th ACM Symposium on Applied Computing*, pp. 21-28, 2004.

Murase, H., et al., "Visual Learning and Recognition of 3-D Objects from Appearance," *International Journal of Computer Vision* 14(1):5-24, 1995.

Naish, M., et al., "Coordinated dispatching of proximity sensors for the surveillance of manoeuvring targets," *Journal of Robotics and Computer Integrated Manufacturing* 19(3):283-299, 2003.

Sanchez, A., et al., "Robot-arm Pick and Place Behavior Programming System Using Visual Perception," in *Proceedings of the 15th International Conference on Pattern Recognition* 4:507-510, Sep. 2000.

Sang, T., et al., "Vision Assisted Robotic Tele-training," Proceedings of the *IEEE International Conference on Mechatronics and Automation*, pp. 1288-1293, Jul. 2005.

Sharma, R., "Visual Servoing with Independently Controlled Cameras Using a Learned Invariant Representation," in *Proceedings of the 37th IEEE Conference on Decision & Control*, pp. 3263-3268, Dec. 1998.

Tarabanis, K. A., et al., "A Survey of Sensor Planning in Computer Vision," *IEEE Transactions on Robotics and Automation* 11(1):86-104, Feb. 1995.

Tarabanis, K. A., et al., "The MVP Sensor Planning System for Robotic Vision Tasks," *IEEE Transactions on Robotics and Automation* 11(1):72-85, Feb. 1995.

Tsai, R. et al., "A New Technique for Fully Autonomous and Efficient 3D Robotics Hand/Eye Calibration," *IEEE Transactions on Robotics and Automation* 5(3):345-358, Jun. 1989.

Tsai, R. et al., "An Efficient and Accurate Camera Calibration Technique for 3D Machine Vision," *Proceedings of IEEE, Conference on Computer Vision and Pattern Recognition*, pp. 364-374, 1986.

Tsai, R., "A Versatile Camera Calibration Technique for High-Accuracy 3D Machine Vision Metrology Using Off-the-Shelf TV Cameras and Lenses," *IEEE Journal of Robotics and Automation* RA-3(4):323-344, Aug. 1987.

Vincze, M., "Robust Tracking of Ellipses at Frame Rate," *The Journal of Pattern Recognition* 34(2):487-498, 2001.

Wei, G.-Q., et al., "Active Self-Calibration of Robotic Eyes and Hand-Eye Relationship with Model Identification," *IEEE Transactions on Robotics and Automation* 14, 19 pages, Feb. 1998.

Wei, G.-Q., et al., "Multisensory Visual Servoing by a Neural Network," *IEEE Transactions on Systems, Man, and Cybernetics, Part B: CYBERNETICS*, 29(2):276-280, Apr. 1999.

Whaite, P., et al., "From Uncertainty to Visual Exploration," *IEEE Transactions on Pattern Analysis and Machine Intelligence* 13(10):1038-1049, 1991.

Zhang, Z., "A Flexible New Technique for Camera Calibration," Microsoft Research Technical Report MSR-TR-98-71, Dec. 2, 1998, 21 pages, http://research.microsoft.com/scripts/pubs/view.asp?TR_ID=MSR-TR-98-71.

Zhou, F., et al., "Complete calibration of a structured light stripe vision sensor through planar target of unknown orientations," *Image and Vision Computing* 23:59-67, 2005.

\* cited by examiner

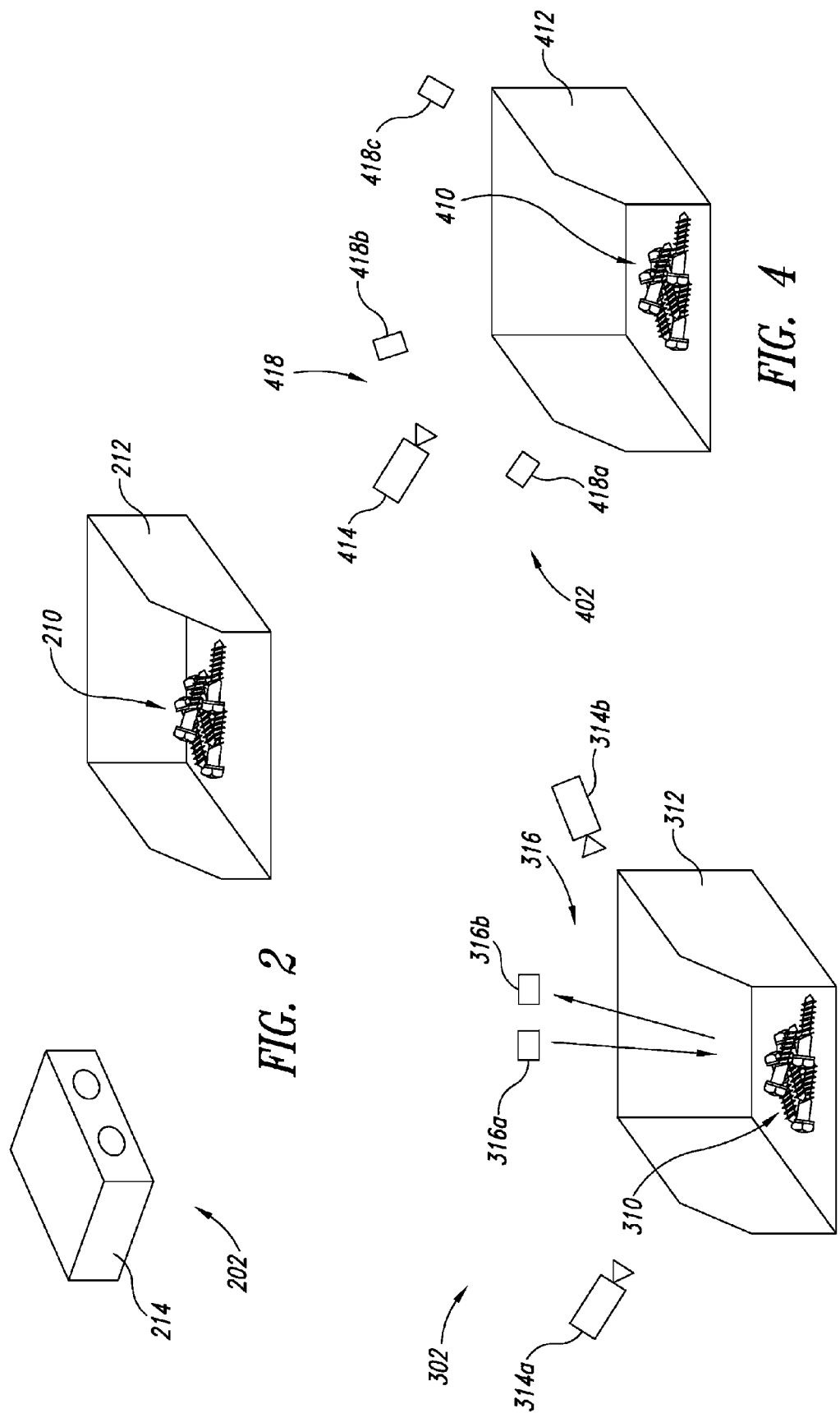

```
                                                            ─1500
                                                          ╱

┌─────────────────────────────────────────────────────────────┐
│ Execute Error Minimization Algorithm To Minimize Error Between Reference │ ─1502
│      Three Dimensional Model And Runtime Three Dimensional Model         │
│        (e.g., Executing Iterative Closest Point Algorithm)               │
└─────────────────────────────────────────────────────────────┘
```

*FIG. 15*

SYSTEM AND METHOD OF THREE-DIMENSIONAL POSE ESTIMATION

BACKGROUND OF THE INVENTION

1. Field of the Invention

This disclosure generally relates to systems and methods of three-dimensional pose estimation employing machine vision, for example useful in robotic systems.

2. Description of the Related Art

The ability to determine a three-dimensional pose (i.e., three-dimensional position and orientation) of an object can be useful in a number of settings. For example, three-dimensional pose estimation may be useful in various robotic systems that employ machine-vision.

One type of machine-vision problem is known as bin picking. Bin picking typically takes the form of identifying an object collocated in a group of identical or similar objects, for example objects such as parts collocated in a bin or other container. Identification may include three-dimensional pose estimation of the object to allow engagement of the object by a robot member and removal of the object from the group of objects.

There are many object recognition methods available for locating complex industrial parts having a large number of machine-vision detectable features. A complex part with a large number of features provides redundancy, and typically can be reliably recognized even when some fraction of the features are not properly detected. However, many parts are simple parts and do not have a sufficient level of redundancy in machine-vision detectable features and/or which have rough edges or other geometric features which are not clear. In addition, the features typically used for recognition, such as edges detected in captured images, are notoriously difficult to extract consistently from image to image when a large number of parts are jumbled together in a bin. The parts therefore cannot be readily located, especially given the potentially harsh nature of the environment, e.g., uncertain lighting conditions, varying amounts of occlusions, etc.

The problem of recognizing a simple part among many parts lying jumbled in a bin, such that a robotic system is able to grasp and manipulate the part in an industrial or other process, is quite different from the problem of recognizing a complex part having many detectable features. Machine-vision based systems recognizing and locating three-dimensional objects, using either (a) two-dimensional data from a single image or (b) three-dimensional data from stereo images or range scanners, are known. Single image methods can be subdivided into model-based and appearance-based approaches.

The model-based approaches suffer from difficulties in feature extraction under harsh lighting conditions, including significant shadowing and specularities. Furthermore, simple parts do not contain a large number of machine-vision detectable features, which degrades the accuracy of a model-based fit to noisy image data.

The appearance-based approaches have no knowledge of the underlying three-dimensional structure of the object, merely knowledge of two-dimensional images of the object. These approaches have problems in segmenting out the object for recognition, have trouble with occlusions, and may not provide a three-dimensional pose estimation that is accurate enough for grasping purposes.

Approaches that use three-dimensional data for recognition have somewhat different issues. Lighting effects cause problems for stereo reconstruction, and specularities can create spurious data both for stereo and laser range finders. Once the three-dimensional data is generated, there are the issues of segmentation and representation. On the representation side, more complex models are often used than in the two-dimensional case (e.g., superquadrics). These models contain a larger number of free parameters, which can be difficult to fit to noisy data.

Assuming that a part can be located, it must be picked up by the robotic system. The current standard for motion trajectories leading up to the grasping of an identified part is known as image based visual servoing (IBVS). A key problem for IBVS is that image based servo systems control image error, but do not explicitly consider the physical camera trajectory. Image error results when image trajectories cross near the center of the visual field (i.e., requiring a large scale rotation of the camera). The conditioning of the image Jacobian results in a phenomenon known as camera retreat. Namely, the robotic system is also required to move the camera back and forth along the optical axis direction over a large distance, possibly exceeding the robotic system range of motion. Hybrid approaches decompose the robotic system motion into translational and rotational components either through identifying homeographic relationships between sets of images, which is computationally expensive, or through a simplified approach which separates out the optical axis motion. The more simplified hybrid approaches introduce a second key problem for visual servoing, which is the need to keep features within the image plane as the robotic system moves.

Conventional bin picking systems are relatively deficient in at least one of the following: robustness, accuracy, and speed. Robustness is required since there may be no cost savings to the manufacturer if the error rate of correctly picking an object from a bin is not close to zero (as the picking station will still need to be manned). Location accuracy is necessary so that the grasping operation will not fail. And finally, solutions which take too long between picks would slow down entire production lines, and would not be cost effective.

BRIEF SUMMARY OF THE INVENTION

In one aspect, an embodiment of a method of object pose estimation using machine-vision may be summarized as including identifying an object region of an image on which pose estimation is being performed based on a correspondence between at least a portion of a representation of an object in the object region of the image and at least a corresponding one of a plurality of reference two-dimensional models of the object, the object region being a portion of the image that contains the representation of at least a portion of the object; and determining a three-dimensional pose of the object based on at least one of a plurality of reference three-dimensional models of the object and a runtime three-dimensional representation of the object region where a point-to-point relationship between the reference three-dimensional models of the object and the runtime three-dimensional representation of the object region is not necessarily previously known.

In another aspect, an embodiment of a computer-readable medium that stores instructions for causing a computer to perform object pose estimation using machine-vision may be summarized as including identifying an object region of an image based on a correspondence between at least a portion of a representation of an object in the object region of the image and at least a corresponding one of a plurality of reference two-dimensional models of the object, the object region being a portion of the image that contains the representation of at least a portion of the object; and determining a three-dimensional pose of the object based on at least one of a plurality of reference three-dimensional models of the object and a runtime three-dimensional representation of the object region where a point-to-point relationship between the reference three-dimensional models of the object and the runtime three-dimensional representation of the object region is not necessarily previously known.

In further aspect, an embodiment of a system to perform three-dimensional pose estimation may be summarized as including at least one sensor; at least one processor; and at least one memory storing processor executable instructions that cause the at least one processor to segment an image captured by the at least one sensor into a number of object regions based at least in part on a correspondence between at least a portion of a representation of an object in the object region of the image and at least a corresponding one of a plurality of reference two-dimensional models of the object and to cause the at least one processor to determine a three-dimensional pose of the object based on at least one of a plurality of reference three-dimensional models of the object that is related to the corresponding one of the plurality of reference two-dimensional models of the object and a runtime three-dimensional representation of the object region where a point-to-point relationship between the reference three-dimensional models of the object and the runtime three-dimensional representation of the object region is not necessarily previously known.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 2 is an isometric view of a sensor system according to another illustrated embodiment, the sensor system including a pair of cameras in a stereo configuration positioned to capture stereo images of the parts in the bin.

FIG. 3 is an isometric view of a sensor system according to still another illustrated embodiment, the sensor system including at least one camera positioned to capture images of the parts in the bin and a range finding system positioned to determine range information indicative of a distance to parts in the bin.

FIG. 4 is an isometric view of a sensor system according to yet another illustrated embodiment, the sensor system including a camera and a structure light system positioned to capture images of the parts in the bin.

FIG. 15 is a flow diagram of illustrating a method of performing a registration according to one illustrated embodiment.

DETAILED DESCRIPTION OF THE INVENTION

In the following description, certain specific details are set forth in order to provide a thorough understanding of various embodiments. However, one skilled in the art will understand that the invention may be practiced without these details. In other instances, well-known structures associated with robotic systems, cameras and other image capture devices, range finders, lighting, as well as control systems including computers and networks, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

Further more, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1:
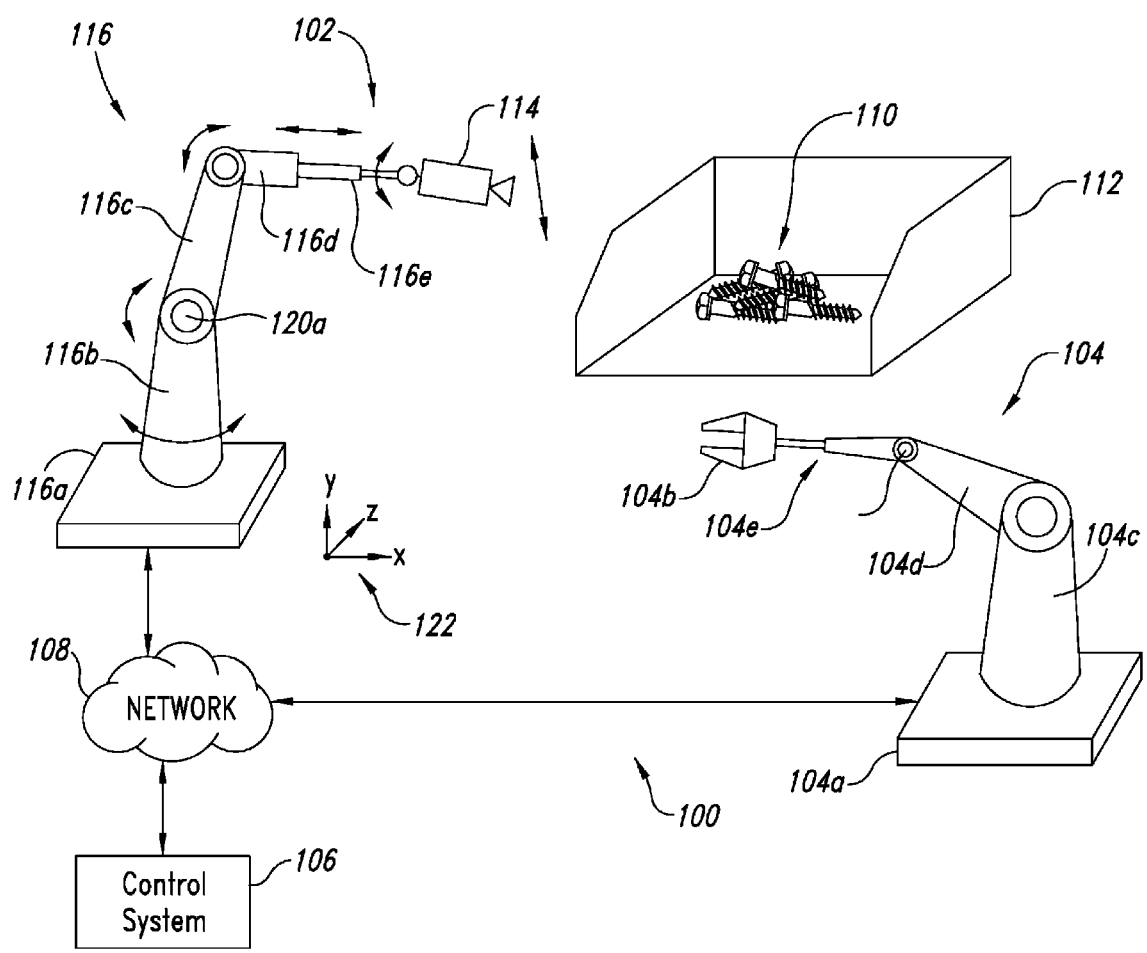
FIG. 1 is an isometric view of a machine-vision based system including a control system, a sensor system and robotic system operating on a bin containing parts, according to one illustrated embodiment, the sensor system including a camera mounted for movement with respect the parts.

FIG. 1 shows a machine-vision based system 100, according to one illustrated embodiment.

The machine-vision based system 100 may include a sensor system 102, a robotic system 104, a control system 106 and a network 108 communicatively coupling the sensor system 102, robotic system 104 and control system 106. The machine-vision based system 100 may be employed to recognize a pose of and manipulate one or more work pieces, for example one or more objects such as parts 110. The parts 110 may be collocated, for example in a container such as a bin 112.

While illustrated as a machine-vision based system 100, aspects of the present disclosure may be employed in other systems, for example non-machine-vision based systems. Such non-machine-vision based systems may, for example, take the form of inspection systems. Also, while illustrated as operating in a bin picking environment, aspects of the present disclosure may be employed in other environments, for example non-bin picking environments in which the objects are not collocated or jumbled.

As illustrated in FIG. 1, the sensor system 102 includes an image capture device 114. The image capture device 114 may take a variety of forms, for example an analog camera or digital camera. The image capture device 114 may, for example, take the form an array of charge coupled devices (CCDs) or complementary metal oxide semiconductor (CMOS) sensors, a Vidicon and other image capture devices.

In some embodiments, the image capture device 114 may be mounted for movement relative to the parts 110. For example, the image capture device 114 may be mounted to a sensor robotic system 116, which may include a base 116a, one or more arms 116b-116e, and one or more servomotors and other suitable actuators (not shown) which are operable to move the various arms 116b-116e and/or base 116a. It is noted that the sensor robotic system 116 may be include a greater or less number of arms and/or different types of members such that any desirable range of rotational and/or translational movement of the image capture device 114 may be provided. Accordingly, the image capture device 114 may be positioned and/or oriented in any desirable pose to capture images of the pile of objects 112. Such permits the capture of images of two or more views of a given part 110, allowing the generation or derivation of three-dimensional data or information regarding the part 110.

In typical embodiments, the position and/or orientation or pose of the various components of the sensor robotic system 116 may be known or ascertainable to the control system 106. For example, the sensor robotic system 116 may include one or more sensors (e.g., encoders, Reed switches, position sensors, contact switches, accelerometers, etc.) or other devices positioned and configured to sense, measure or otherwise determine information indicative of a current position, speed, acceleration, and/or orientation or pose of the image capture device 114 in a defined coordinate frame (e.g., sensor robotic system coordinate frame, real world coordinate frame, etc.).

The control system 106 may receive information from the various sensors or devices, and/or from actuators indicating position and/or orientation of the arms 116b-116e. Alternatively, or additionally, the control system 106 may maintain the position and/or orientation or pose information based on movements of the arms 116b-116e made from an initial position and/or orientation or pose of the sensor robotic system 116. The control system 106 may computationally determine a position and/or orientation or pose of the image capture device 114 with respect to a reference coordinate system 122. Any suitable position and/or orientation or pose determination methods, systems or devices may be used by the various embodiments. Further, the reference coordinate system 122 is illustrated for convenience as a Cartesian coordinate system using an x-axis, a y-axis, and a z-axis. Alternative embodiments may employ other reference systems, for example a polar coordinate system.

The robotic system 104 may include a base 104a, an end effector 104b, and a plurality of intermediate members 104c-104e. End effector 104b is illustrated for convenience as a grasping device operable to grasp a selected one of the objects 110 from the pile of objects 110. Any device that can engage a part 110 may be suitable as an end effector device(s).

In typical embodiments, the position and/or orientation or pose of the various components of the robotic system 104 may be known or ascertainable to the control system 106. For example, the robotic system 104 may include one or more sensors (e.g., encoders, Reed switches, position sensors, contact switches, accelerometers, etc.) or other devices positioned and configured to sense, measure or otherwise determine information indicative of a current position and/or orientation or pose of the end effector 104b in a defined coordinate frame (e.g., robotic system coordinate frame, real world coordinate frame, etc.). The control system 106 may receive information from the various sensors or devices, and/or from actuators indicating position and/or orientation of the arms 104c-104e. Alternatively, or additionally, the control system 106 may maintain the position and/or orientation or pose information based on movements of the arms 104c-104e made from an initial position and/or orientation or pose of the robotic system 104. The control system 106 may computationally determine a position and/or orientation or pose of the end effector 104b with respect to a reference coordinate system 122. Any suitable position and/or orientation or pose determination methods, systems or devices may be used by the various embodiments.

FIG. 2 shows a sensor system 202 positioned to capture images of parts 210 which may, for example, be collocated in a bin 212, according to another embodiment.

In particular, the sensor system 202 includes a pair of cameras 214 to produce stereo images. The pair of cameras 214 may be packaged as a stereo sensor (commercially available) or may be separate cameras positioned to provide stereo images. Such permits the capture of stereo images of a given part 210 from two different views, allowing the generation or derivation of three-dimensional data or information regarding the part 210.

FIG. 3 shows a sensor system 302 positioned to capture three-dimensional information or data regarding parts 310 which may, for example, be collocated in a bin 312, according to another embodiment.

In particular, the sensor system 302 includes at least one image capture device 314a, 314b and at least one range finding device 316, which may, for example, include a transmitter 316a and receiver 316b. The range finding device 316 may, for example, take the form of a laser range finding device, infrared range finding device or ultrasonic range finding device. Other range finding devices may be employed. Such permits the capture of images of a given part 310 along with distance data, allowing the generation or derivation of three-dimensional data or information regarding the part 310.

FIG. 4 shows a sensor system 402 positioned to capture three-dimensional information or data regarding parts 410 which may, for example, be collocated in a bin 412, according to another embodiment.

In particular, the sensor system 402 includes at least one image capture device 414 and structured lighting 418. The structure lighting 418 may, for example, include one or more light sources 418a, 418b. Such permits the capture of images of a given part 410 from two or more different lighting perspectives, allowing the generation or derivation of three-dimensional data or information regarding the part 410.

As will be described in more detail below with reference to FIG. 5, the control system 106 may take a variety of forms including one or more controllers, processors, microprocessors, digital signal processors (DSPs), application specific integrated circuits (ASICs), field programmable gate arrays (FPGAs) and associated devices and buses.

Discussion of a Suitable Computing Environment

Figure 5:
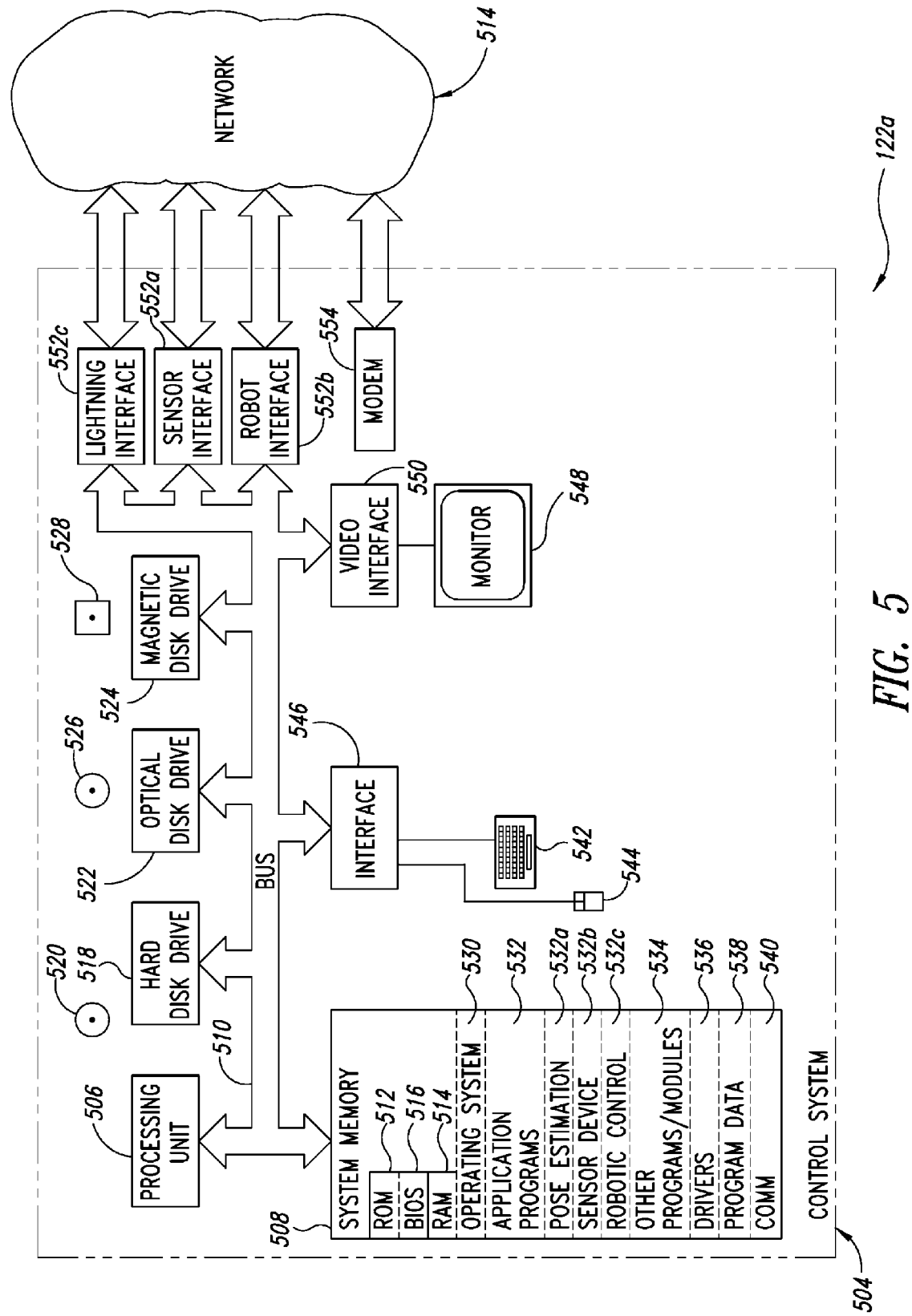
FIG. 5 is a block diagram illustrating a control system, according to one illustrated embodiment.

FIG. 5 and the following discussion provide a brief, general description of a suitable control system 504 in which the various illustrated embodiments can be implemented. The control system 504 may, for example, implement the control system 106 (FIG. 1). Although not required, some portion of the embodiments will be described in the general context of computer-executable instructions or logic, such as program application modules, objects, or macros being executed by a computer. Those skilled in the relevant art will appreciate that the illustrated embodiments as well as other embodiments can be practiced with other computer system configurations, including handheld devices, multiprocessor systems, microprocessor-based or programmable consumer electronics, personal computers ("PCs"), network PCs, minicomputers, mainframe computers, and the like. The embodiments can be practiced in distributed computing environments where tasks or modules are performed by remote processing devices, which are linked through a communications network. In a distributed computing environment, program modules may be located in both local and remote memory storage devices.

The control system 504 may take the form of a conventional PC, which includes a processing unit 506, a system memory 508 and a system bus 510 that couples various system components including the system memory 508 to the processing unit 506. The control system 504 will at times be referred to in the singular herein, but this is not intended to limit the embodiments to a single system, since in certain embodiments, there will be more than one system or other networked computing device involved. Non-limiting examples of commercially available systems include, but are not limited to, an 80×86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, or a 68xxx series microprocessor from Motorola Corporation.

The processing unit 506 may be any logic processing unit, such as one or more central processing units (CPUs), microprocessors, digital signal processors (DSPs), application-specific integrated circuits (ASICs), field programmable gate arrays (FPGAs), etc. Unless described otherwise, the construction and operation of the various blocks shown in FIG. 5 are of conventional design. As a result, such blocks need not be described in further detail herein, as they will be understood by those skilled in the relevant art.

The system bus 510 can employ any known bus structures or architectures, including a memory bus with memory controller, a peripheral bus, and a local bus. The system memory 508 includes read-only memory ("ROM") 512 and random access memory ("RAM") 514. A basic input/output system ("BIOS") 516, which can form part of the ROM 512, contains basic routines that help transfer information between elements within the user system 104a, such as during start-up. Some embodiments may employ separate buses for data, instructions and power.

The control system 504 also includes a hard disk drive 518 for reading from and writing to a hard disk 520, and an optical disk drive 522 and a magnetic disk drive 524 for reading from and writing to removable optical disks 526 and magnetic disks 528, respectively. The optical disk 526 can be a CD or a DVD, while the magnetic disk 528 can be a magnetic floppy disk or diskette. The hard disk drive 518, optical disk drive 522 and magnetic disk drive 524 communicate with the processing unit 506 via the system bus 510. The hard disk drive 518, optical disk drive 522 and magnetic disk drive 524 may include interfaces or controllers (not shown) coupled between such drives and the system bus 510, as is known by those skilled in the relevant art. The drives 518, 522, 524, and their associated computer-readable media 520, 526, 528, provide nonvolatile storage of computer-readable instructions, data structures, program modules and other data for the user system 504. Although the depicted user system 504 employs hard disk 520, optical disk 526 and magnetic disk 528, those skilled in the relevant art will appreciate that other types of computer-readable media that can store data accessible by a computer may be employed, such as magnetic cassettes, flash memory cards, Bernoulli cartridges, RAMs, ROMs, smart cards, etc.

Program modules can be stored in the system memory 508, such as an operating system 530, one or more application programs 532, other programs or modules 534, drivers 536 and program data 538.

The application programs 532 may, for example, include pose estimation logic 532a, sensor device logic 532b, and robotic system control logic 532c. The logic 532a-532c may, for example, be stored as one or more executable instructions. As discussed in more detail below, the pose estimation logic 532a may include logic or instructions to perform initialization, training and runtime three-dimensional pose estimation, and may include matching or registration logic. The sensor device logic 532b may include logic to operate image capture devices, range finding devices, and light sources, such as structured light sources. As discussed in more detail below, the sensor device logic 532b may also include logic to convert information captured by the image capture devices and range finding devices into two-dimensional and/or three-dimensional information or data, for example two dimension and/or three-dimensional models of objects. In particular, the sensor device logic 532b may include image processing or machine-vision logic to extract features from image data captured by one or more image capture devices 114, 214, 314a, 314b, 414 into two or three-dimensional information, data or models. The sensor device logic 532b may also include logic to convert range information captured by the range finding device 316 into three-dimensional information or models of objects. The robotic system logic may include logic to convert three-dimensional pose estimations into drive signals to control the robotic system 104 or to provide appropriate information (e.g., transformations) to suitable drivers of the robotic system 104.

The system memory 508 may also include communications programs 540, for example a server and/or a Web client or browser for permitting the user system 504 to access and exchange data with sources such as Web sites on the Internet, corporate intranets, or other networks as described below. The communications programs 540 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. A number of servers and/or Web clients or browsers are commercially available such as those from Mozilla Corporation of California and Microsoft of Washington.

While shown in FIG. 5 as being stored in the system memory 508, the operating system 530, application programs 532, other programs/modules 534, drivers 536, program data 538 and communications program 540 can be stored on the hard disk 520 of the hard disk drive 518, the optical disk 526 of the optical disk drive 522 and/or the magnetic disk 528 of the magnetic disk drive 524. A user can enter commands and information into the control system 504 through input devices such as a touch screen or keyboard 542 and/or a pointing device such as a mouse 544. Other input devices can include a microphone, joystick, game pad, tablet, scanner, biometric scanning device, etc. These and other input devices are connected to the processing unit 506 through an interface 546 such as a universal serial bus ("USB") interface that couples to the system bus 510, although other interfaces such as a parallel port, a game port or a wireless interface or a serial port may be used. A monitor 548 or other display device is coupled to the system bus 510 via a video interface 550, such as a video adapter. Although not shown, the control system 504 can include other output devices, such as speakers, printers, etc.

The control system 504 operates in a networked environment using one or more of the logical connections to communicate with one or more remote computers, servers and/or devices via one or more communications channels, for example a network 514. These logical connections may facilitate any known method of permitting computers to communicate, such as through one or more LANs and/or WANs, such as the Internet. Such networking environments are well known in wired and wireless enterprise-wide computer networks, intranets, extranets, and the Internet. Other embodiments include other types of communication networks including telecommunications networks, cellular networks, paging networks, and other mobile networks.

When used in a WAN networking environment, the control system 504 may include a modem 554 for establishing communications over the WAN 514. The modem 554 is shown in FIG. 5 as communicatively linked between the interface 546 and the WAN 514. Additionally or alternatively, another device, such as a network interface, that is communicatively linked to the system bus 510, may be used for establishing communications over the WAN 514. In particular, a sensor interface 552*a* may provide communications with a sensor system (e.g., sensor system 102 of FIG. 1; sensor system 202 of FIG. 2, sensor system 302 of FIG. 3; sensor system 402 of FIG. 4). A robot interface 552*b* may provide communications with a robotic system (e.g., robotic system 104 of FIG. 1). A lighting interface 552*c* may provide communications with specific lights or a lighting system (e.g., lighting system 418 of FIG. 4).

In a networked environment, program modules, application programs, or data, or portions thereof, can be stored in a server computing system (not shown). Those skilled in the relevant art will recognize that the network connections shown in FIG. 5 are only some examples of ways of establishing communications between computers, and other connections may be used, including wirelessly.

For convenience, the processing unit 506, system memory 508, and interfaces 546, 552*a*-552*c* are illustrated as communicatively coupled to each other via the system bus 510, thereby providing connectivity between the above-described components. In alternative embodiments of the control system 504, the above-described components may be communicatively coupled in a different manner than illustrated in FIG. 5. For example, one or more of the above-described components may be directly coupled to other components, or may be coupled to each other, via intermediary components (not shown). In some embodiments, system bus 510 is omitted and the components are coupled directly to each other using suitable connections.

Discussion of Exemplary Operation

Operation of an exemplary embodiment of the machine-vision based system 100 will now be described in greater detail. While reference is made throughout the following discuss to the embodiment of FIG. 1, the method may be employed with the other described embodiments, as well as even other embodiments, with or without modification.

Figure 6:
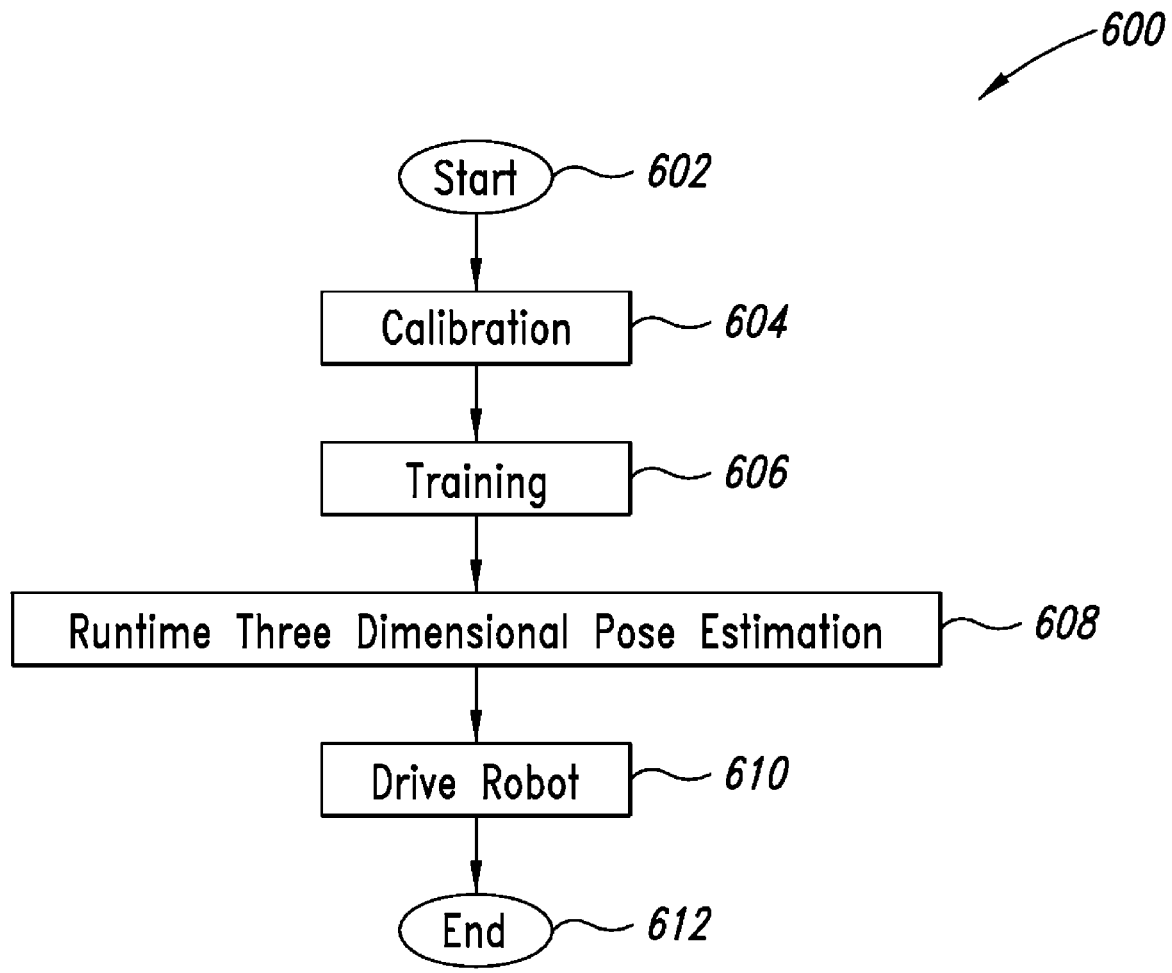
FIG. 6 is a flow diagram of a method of operating a machine-vision system to perform three-dimensional pose estimation according to one illustrated embodiment, the method including calibrating, training in a training mode or time before a runtime or runtime mode, and three-dimensional pose estimating during the runtime or runtime mode.

FIG. 6 shows a method 600 of operating a machine-vision based system 100, according to one illustrated embodiment.

The method 600 starts at 602. The method 600 may start, for example, when power is supplied to the machine-vision based system 100 or in response to activation by a user or by an external system, for example the robotic system 104.

At 604, the machine-vision based system 100 and in particular the sensor system 102 are calibrated in a setup mode or time. The setup mode or time typically occurs before a training mode or time, and before a runtime or runtime mode. The calibration 604 may include intrinsic and/or extrinsic calibration of image capture devices 114 as well as calibration of range finding devices 316 and/or lighting 418. The calibration 604 may include any one or more of a variety of acts or operations.

For example, intrinsic calibration may be performed for all the image capture devices 114, and may involve the determination of the internal parameters such as focal length, image sensor center and distortion factors. An explanation of the preferred calibration algorithms and descriptions of the variables to be calculated can be found in commonly assigned U.S. Pat. No. 6,816,755 issued on Nov. 9, 2004, and pending application Ser. No. 10/634,874 and Ser. No. 11/183,228. The method 600 may employ any of the many other known techniques for performing the intrinsic calibration. In some embodiments, the intrinsic calibration of the image capture devices 114 may be performed before installation in the field. In such situations, the calibration data is stored and provided for each image capture devices 114. It is also possible to use typical internal parameters for a specific image sensor, for example parameters associate with particular camera model-lens combinations. Where a pair of cameras 314 are in a stereo configuration, camera-to-camera calibration may be performed.

For example, extrinsic calibration may be preformed by determining the pose of one or more of the image capture devices 114. For example, one of the image capture devices 114 may be calibrated relative to a robotic coordinate system, while the other image capture devices 114 are not calibrated. Through extrinsic calibration the relationship (i.e., three-dimensional transformation) between an image sensor coordinate reference frame and an external coordinate system (e.g., robotic system coordinate reference system) is determined, for example by computation. In at least one embodiment, extrinsic calibration is performed for at least one image capture devices 114 to a preferred reference coordinate frame, typically that of the robotic system 104. An explanation of the preferred extrinsic calibration algorithms and descriptions of the variables to be calculated can be found in commonly assigned U.S. Pat. No. 6,816,755 issued on Nov. 9, 2004 and pending application Ser. No. 10/634,874 and Ser. No. 11/183,228. The method may employ any of the many other known techniques for performing the extrinsic calibration.

Some embodiments may omit extrinsic calibration of the image capture devices 114, for example where the method 600 is employed only to create a comprehensive object model without driving the robotic system 104.

At 606, the machine-vision based system is trained in a training mode or time. In particular, the machine-vision based system 100 is trained to recognize work pieces or objects, for example parts 110. Training is discussed in more detail below with reference to FIGS. 7-9.

At 608, the machine-vision based system 100 performs three-dimensional pose estimation in at runtime or in a runtime mode. In particular, the machine-vision based system 100 employs reference two-dimensional information or models to identify object regions in an image, and employs reference three-dimensional information or models to determine a three-dimensional pose of an object represented in the object region. The three-dimensional pose of the object may be determined based on at least one of a plurality of reference three-dimensional models of the object and a runtime three-dimensional representation of the object region where a point-to-point relationship between the reference three-dimensional models of the object and the runtime three-dimensional representation of the object region is not necessarily previously known. Three-dimensional pose estimation is discussed in more detail below with reference to FIGS. 10-15.

Optionally, at 610 the machine-vision based system 100 drives the robotic system 102. For example, the machine-vision based system may provide control signals to the robotic system or to an intermediary robotic system controller to cause the robotic system to move from one pose to another pose. The signals may, for example, encode a transformation.

The method 600 terminates at 612. The method 600 may terminate, for example, in response to a disabling of the machine-vision based system 100 by a user, the interruption of power, or an absence of parts 110 in an image of the bin 112.

Figure 7:
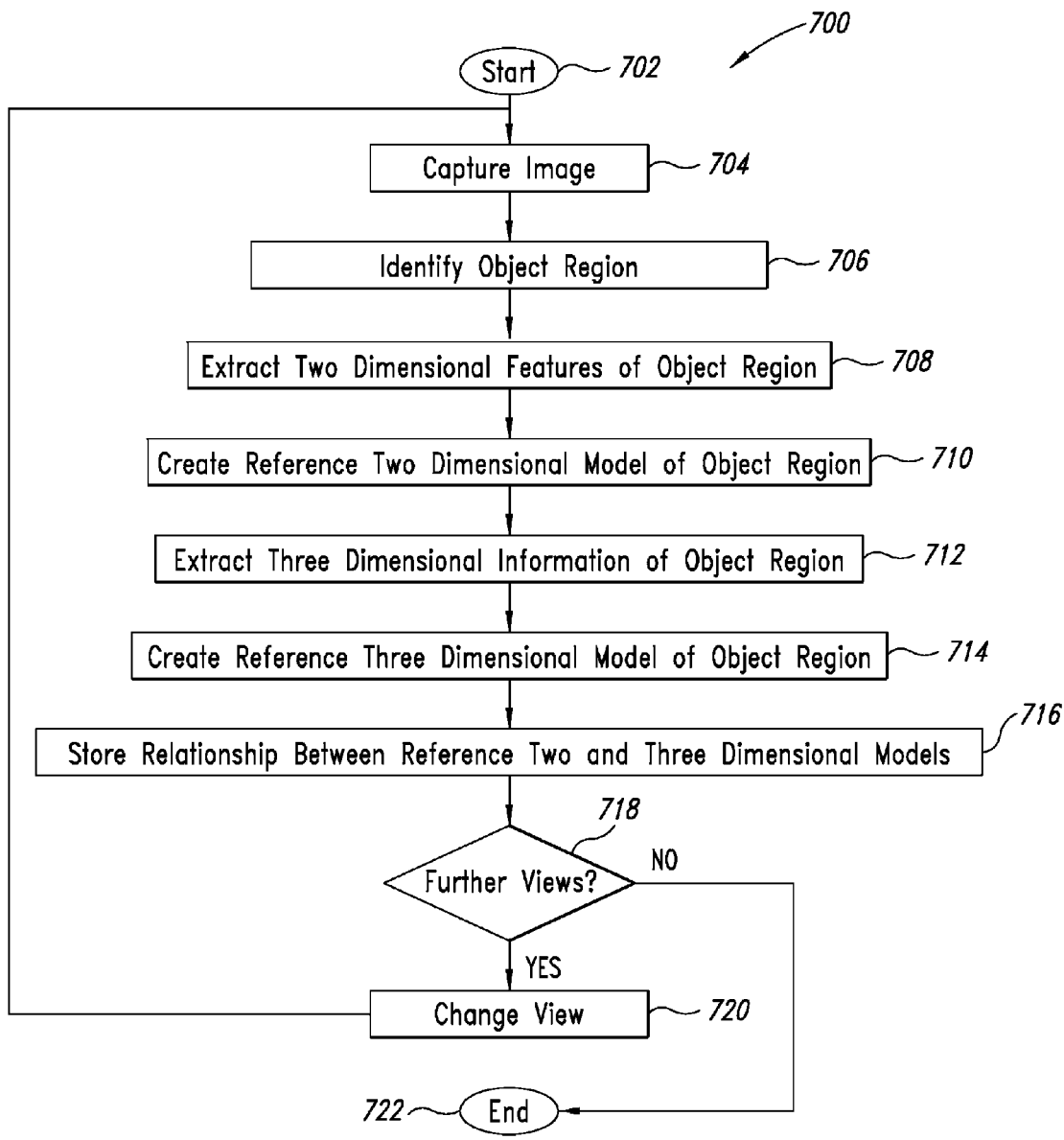
FIG. 7 is a flow diagram of a method of training a machine-vision system according to one illustrated embodiment, the method including extracting two-dimensional feature information, creating reference two-dimensional models, extracting three-dimensional information and creating reference three-dimensional model.

FIG. 7 shows a method of training 700 the machine-vision based system 100, according to one illustrated embodiment. Training refers to the process whereby a training, sample, or reference object (e.g., part 110) and its attributes are introduced to the machine-vision system 100. During the training process, various views of the training object are captured or acquired and various landmark features are selected whose geometrical properties are determined and stored. In some embodiments the views may be stored along with sparse model information, while in other embodiments feature information extracted from the views may be stored along with the sparse model information.

The method 700 starts at 702, for example in response to an appropriate input by a user. The method 700 may be performed manually, automatically or a combination of manually and automatically.

Optionally at 704, the image sensor 114 captures an image of a first view of a work piece or training object such as a part 110. As explained below, some embodiments may employ existing information, for example existing digital models of the object or existing images of the object for training.

At 706, an object region is identified, the object region including a representation of at least a portion of the training object. The object region may be identified manually or automatically or a combination of manually and automatically, for example by application of one or more rules to a computer or digital model of training the object.

At 708, the control system 504 extracts reference two-dimensional information or data, for example in the form of features. The reference two-dimensional information or data may be features that are discernable in the captured image, and which are good subjects for machine-vision algorithms. Alternatively, the reference two-dimensional information or data may be features that are discernable in a two-dimensional projection of a computer model of the training object. The features may, for example, include points, lines, edges, contours, circles, corners, centers, radia, image patches, etc. In some embodiments, the feature on the object (e.g., part 110) is an artificial feature. The artificial feature may be painted on the object or may be a decal or the like affixed to the object.

Figure 8:
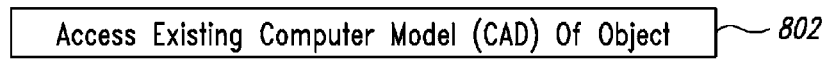
FIG. 8 is a flow diagram of a method of extracting two- and three-dimensional information according to one illustrated embodiment in which the two- and three-dimensional feature information is extracted by accessing an existing computer or digital model of the object.
Figure 9:
FIG. 9 is a flow diagram of a method of extracting two- and three-dimensional information according to another illustrated embodiment in which the two- and three-dimensional feature information is extracted from data sensed from a representative of training object.

The extraction 708 may include the manual identification of suitable features by a user and/or automatic identification of suitable features, for example defined features in a computer model, such as a digital model. As illustrated in FIG. 8, extraction 708 of the features may include performing a method 800, which accesses an existing computer digital model (e.g., computer aided design or CAD model) of the part 110 at 802. As illustrated in FIG. 9, extraction 708 of the features may include performing a method 800, which employs sensed data or information, for example at 902 accessing the image captured at 704 (FIG. 7).

At 710, the machine-vision based system 100 creates a reference two-dimensional model using the extracted reference two-dimensional information. The reference two-dimensional model may include information or data representative of some or all of the extracted features. For example, the reference two-dimensional model may include points defining a line, edge or contour, or a point defining a center of an opening and a radius defining a perimeter of the opening. Various approaches to defining and/or storing the reference two-dimensional information representing a feature may be employed.

At 712, the control system 106 extracts reference three-dimensional information or data. For example, the control system 106 may extract reference three-dimensional information or data in the form of a reference three-dimensional point cloud (also referred to as a dense point cloud or stereo dense point cloud) for all or some of the image points in the object region.

The reference three-dimensional information may be extracted in a variety of ways, at least partially based on the particular components of the machine-vision based system 100. For example, the machine-vision based system 100 may employ two or more images of slightly different views of an object such as a part 110. For instance, in the embodiment of FIG. 1, the machine-vision based system 100 may cause the image capture device 114 to capture an image at a first view, then cause the sensor robotic system 116 to move the image capture device 114 to capture an image of the part 110 at second view, to produce a stereo pair of images. The machine-vision based system 100 may perform stereo processing on the stereo pair of images to derive and/or extract the reference three-dimensional data or information. Also for example, in the embodiment of FIG. 2, the machine-vision based system 100 may employ the pair of cameras 214 to produce the stereo pair of images, and process the same accordingly to produce a stereo dense point cloud. Suitable packaged stereo pairs of camera 214 with suitable processing software are commercially available from a variety of sources. As a further example, in the embodiment of FIG. 3 the machine-vision based system 100 may employ an image captured by the image capture device 314a, 314b along with range finding data or information acquired by the range finding device 316 to derive or extract the reference three-dimensional information or data. Such range finding information or data may, for example, be determined using laser triangulation or laser time of flight techniques. Such range finding information or data may, for example, be determined using ultrasonic or infrared range finding techniques. As yet a further example, the machine-vision based system 100 embodiment of FIG. 4 may employ two or more images captured with different lighting to derive or extract the reference three-dimensional information or data. As an even further example, the machine-vision based system 100 may employ a computer or digital model of the training object to extract the reference three-dimensional information or data.

At 714, the machine-vision based system 100 creates a reference three-dimensional model using the extracted reference three-dimensional information or data. The reference three-dimensional model may include three-dimensional information or data representative of some or all of the extracted reference information or data. For example, the reference three-dimensional model may include a point cloud, dense point cloud, or stereo dense point cloud. Various approaches to defining and/or storing the reference three-dimensional information or data may be employed.

At 716, the machine-vision based system 100 may store relationships between the reference two- and three-dimensional models. Such may be an explicit act, or may be inherent in the way the reference two- and three-dimensional models are themselves stored. For example, the machine-vision based system 100 may store information that is indicative or reflects the relative pose between the image capture device and the object or part 110, and between the reference two- and three-dimensional models of the particular view.

At 718, the machine-vision based system 100 determines whether additional views of the training object (e.g., training part) are to be trained. Typically, several views of each stable pose of an object (e.g., part 110) are desired. If so, control passes to 720, if not control passes to 722.

At 720, the machine-vision based system 100 changes the view of the training object, for example changing the pose of the image capture device 114 with respect to the training object (e.g., training part). The machine-vision based system 100 may change the pose using one or more of a variety of approaches. For example, in the machine-vision based system 100 of the embodiment of FIG. 1, the control system 106 may cause the sensor robot system 116 to move the image capture device 114 with respect to the training part 110. Also for example, in the machine-vision based system 100 of the embodiment of FIG. 3, the machine-vision based system 100 may employ multiple image capture devices 314a, 314b which are positioned at various locations to provide different views of the training object (e.g., training part). Alternatively or additionally, the machine-vision based system 100 may cause the training part to be moved, for example where the training part is on a conveyor or table or is held by the end effector 104b of a robotic system 104.

At 722, the method 700 terminates. An appropriate indication may be provided to a user, for example prompting the user to enter runtime or the runtime mode. Control may pass back to a calling routine or program, or may automatically or manually enter a runtime routine or program.

Figure 10:
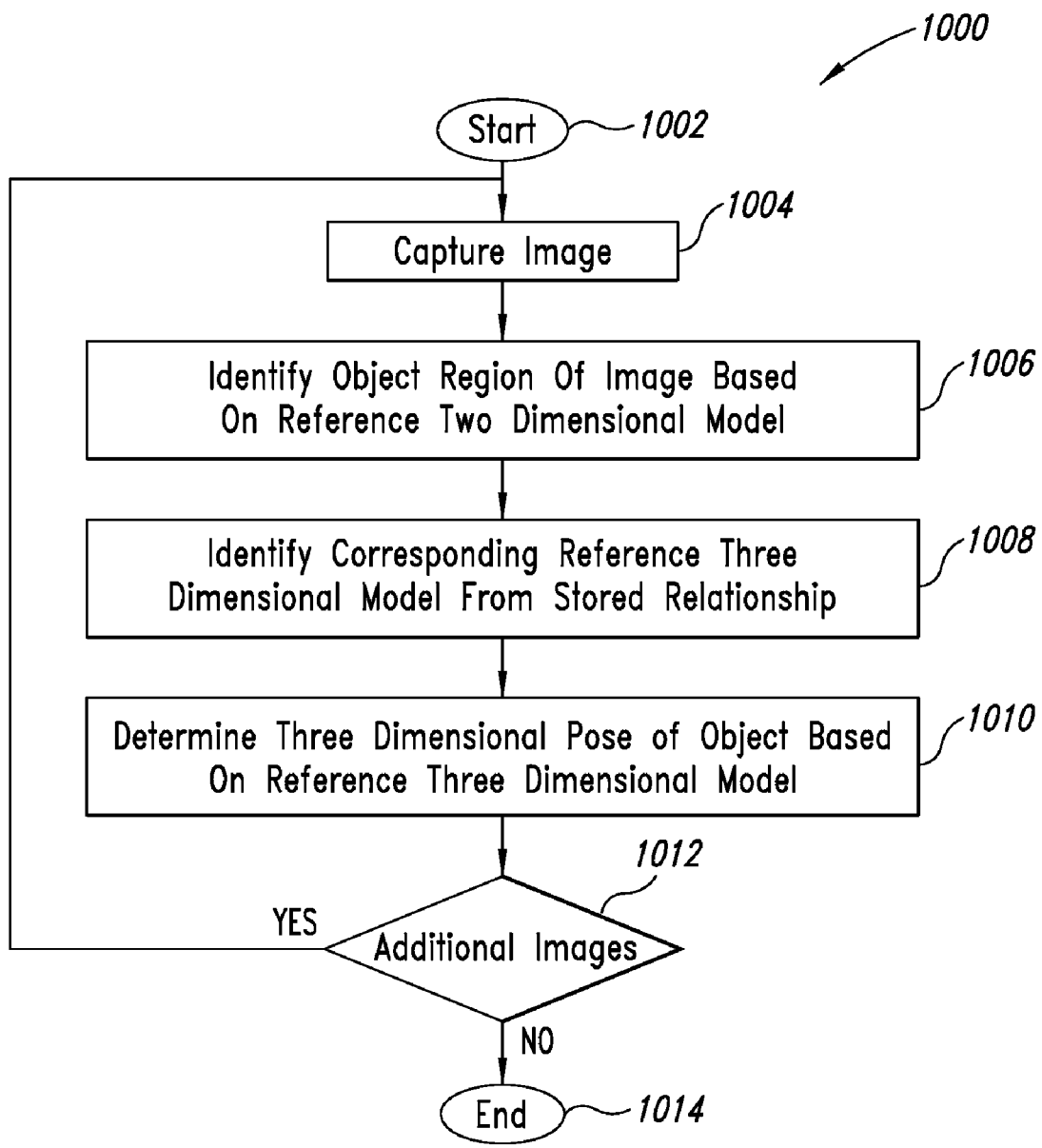
FIG. 10 is a flow diagram of a method of performing runtime three-dimensional pose estimation according to one illustrated embodiment which includes capturing an image, identifying a object region, identifying a reference three-dimensional model that corresponds to the identified object region, and determining a three-dimensional pose estimation for the object.

FIG. 10 shows a method 1000 of performing three-dimensional pose estimation, according to one illustrated embodiment.

The method 1000 starts at 1002 during runtime or in the runtime mode. For example, the method 1000 may start in response to input from a user, the occurrence of the end of the method 700, or the appearance of parts 110.

At 1004, the machine-vision based system 100 captures an image of a location where one or more of the parts 110 may be present. For example, the control system 106 may cause one of the image capture devices 114, 214, 314a, 314b, 414 to capture an image of all or a portion of the parts 110.

At 1006, the machine-vision based system 100 identifies an object region of the captured image based on reference two-dimensional information or data, for example based on at least one of the reference two-dimensional models of the object created during the training mode or time. For example, the control system 106 may employ any one or more of various two-dimensional machine-vision techniques to recognize objects in the image based on the features stored as the reference two-dimensional information or data or reference two-dimensional models. Such techniques may include one or more of correlation based pattern matching, blob analysis, and/or geometric pattern matching, to name a few. Identification of an objection typically means that the object (e.g., part 110) in the object region has a similar pose relative to the sensor (e.g., image capture device 114) as the pose of the training object that produced the particular reference two-dimensional model.

At 1008, the machine-vision based system 100 identifies a corresponding one of the reference three-dimensional information or data, for example one of the reference three-dimensional models of the training object created during training. For example, the control system 106 may rely on the relationship stored 716 at of the method 700. Such may be stored as a relationship in a database, for example as a lookup table. Such may be stored as a logical connection between elements of a record or as a relationship between records of a data structure. Other approaches to storing and retrieving or otherwise identifying the relationship will be apparent to those of skill in the computing arts.

At 1010, the machine-vision based system 100 determines a three-dimensional pose of the object (e.g., part 110) based on the reference three-dimensional information or data, for example the reference three-dimensional model identified at 1008.

Optionally, at 1012 the machine-vision based system 100 determines if additional images or portions thereof will be processed. Control returns to 1004 if additional images or portions thereof will be processed. Otherwise control passes to 1014, where the method 1000 terminates. Alternatively, the method 1000 may pass control directly from determining the three-dimensional pose estimation at 1010 to terminating at 1014.

Figure 11:
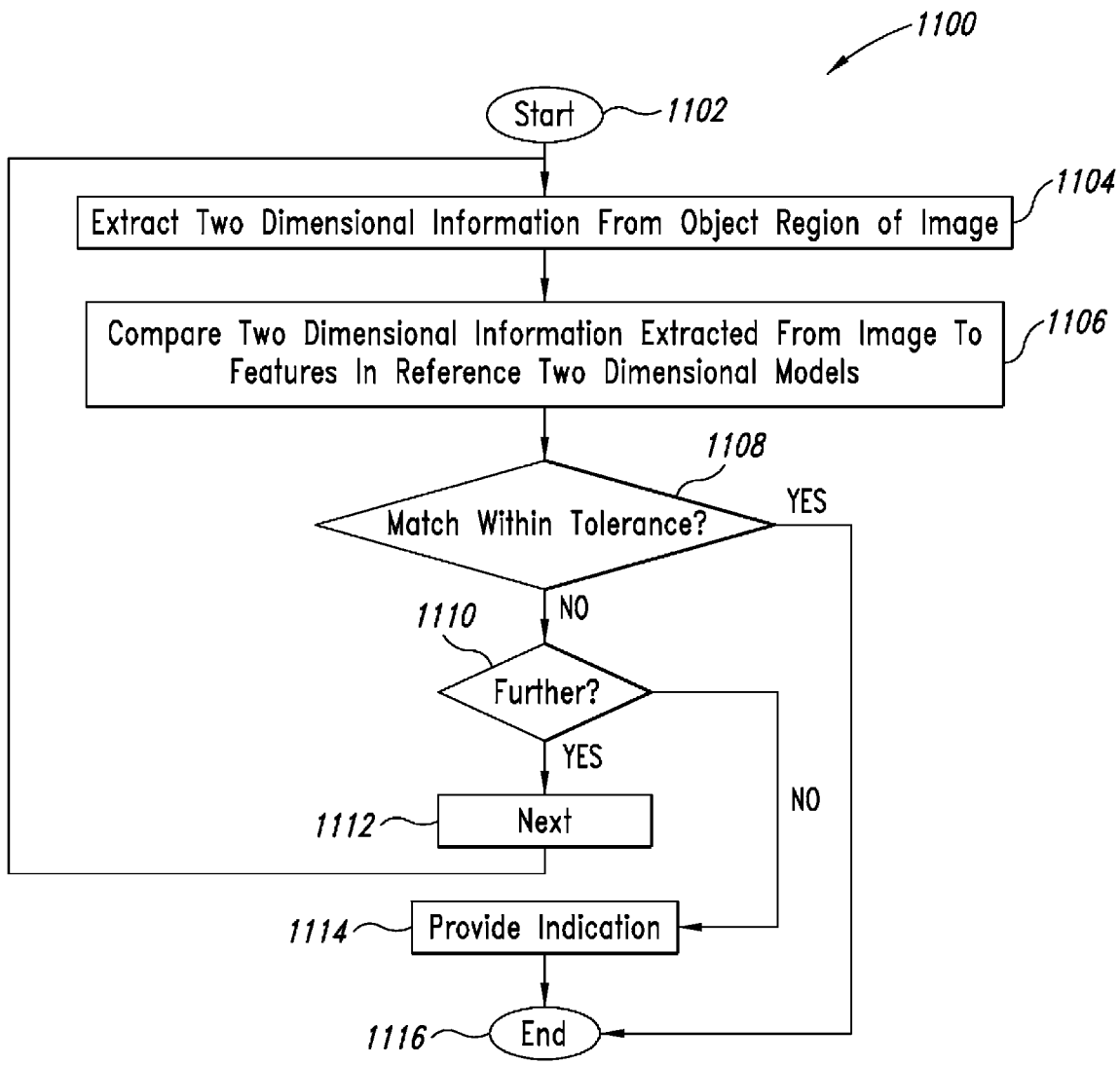
FIG. 11 is a flow diagram of a method of identifying object regions in an image, according to one illustrated embodiment.

FIG. 11 shows a method 1100 of identifying object regions in an image, according to one illustrated embodiment, where the identified object region is a region of the image that contains a representation of at least part of an object. The method 1100 may be suitable for performing the act 1006 of the method 1000 (FIG. 10).

The method 1100 starts at 1102, for example called as part of executing act 1006 of the method 1000.

At 1104, the machine-vision based system 100 extracts two-dimensional information from a first region of a captured image.

Figure 12:
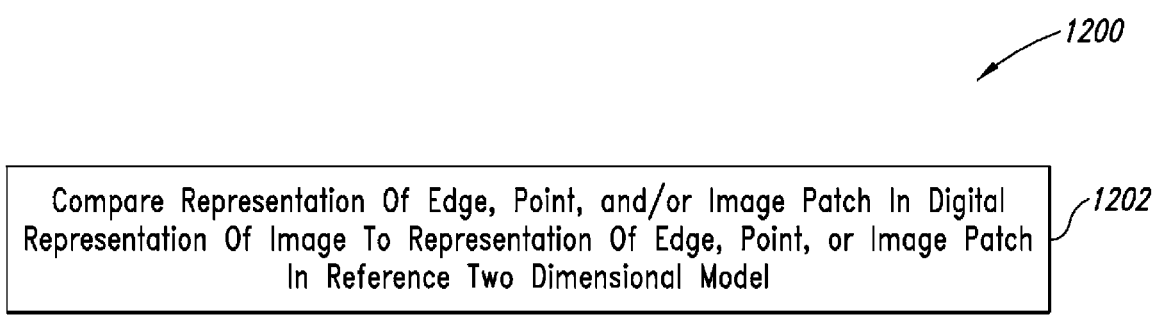
FIG. 12 is a flow diagram of a method illustrating types of data on which may be used to identify the object region according to one illustrated embodiment.
Figure 13:
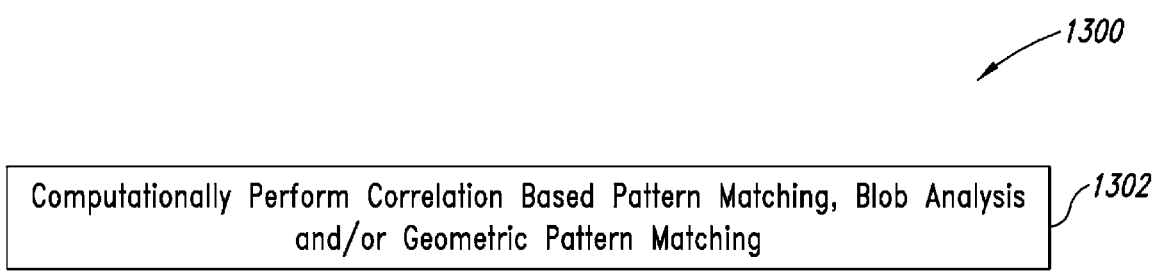
FIG. 13 is a flow diagram of a method illustrating a variety of approaches for identifying the object region according to one illustrated embodiment.

At 1106, the machine-vision based system 100 compares the two-dimensional information or data extracted from the first region of the image to reference two-dimensional information or data (e.g., representing features) such as reference two-dimensional models of the object. FIG. 12 shows one method 1200 illustrating some of the types of elements that may be compared as part of the comparison 1106. In particular, the representations of edges, points, and/or image patches in a computer digital two-dimensional representation of the first region of the captured image may be compared with edges, points, and/or image patches in the reference two-dimensional model at 1202. FIG. 13 shows one method 1300 of illustrating some of the particular types of comparisons that may be performed on various types of elements. In particular, the machine-vision based system 100 may computationally perform correlation based pattern matching, blob analysis and/or geometric pattern matching at 1302.

At 1108, the machine-vision based system 100 determines based on the comparison whether the two-dimensional information, data or models of the first region of the captured image match the reference two-dimensional information, data or models within a defined tolerance. If so, an object region containing a representation of at least a portion of an object has been found, and control passes to 1116 where the method 1100 terminates. If not, an object region has not been found and control passes to 1110.

At 1110, the machine-vision based system 100 determines whether there are further portions of the captured image to be analyzed to find object regions. If there are not further portions of the captured image to be analyzed, then the machine-vision based system 100 has determined that the captured image does not include representations of the trained object. The machine-vision based system 100 provides a suitable indication of the lack of objects in the captured image at 1114 and terminates at 1116. If there are further portions of the captured image to be analyzed, control passes to 1112.

At 1112, the machine-vision based system 100 identifies a portion of the captured image that has not been previously analyzed, and returns control to 1104 to repeat the process. The various acts of the method 1100 may be repeated until an object region is located or until it is determined that the captured image does not contain a representation of the object or a time out condition occurs.

Figure 14:
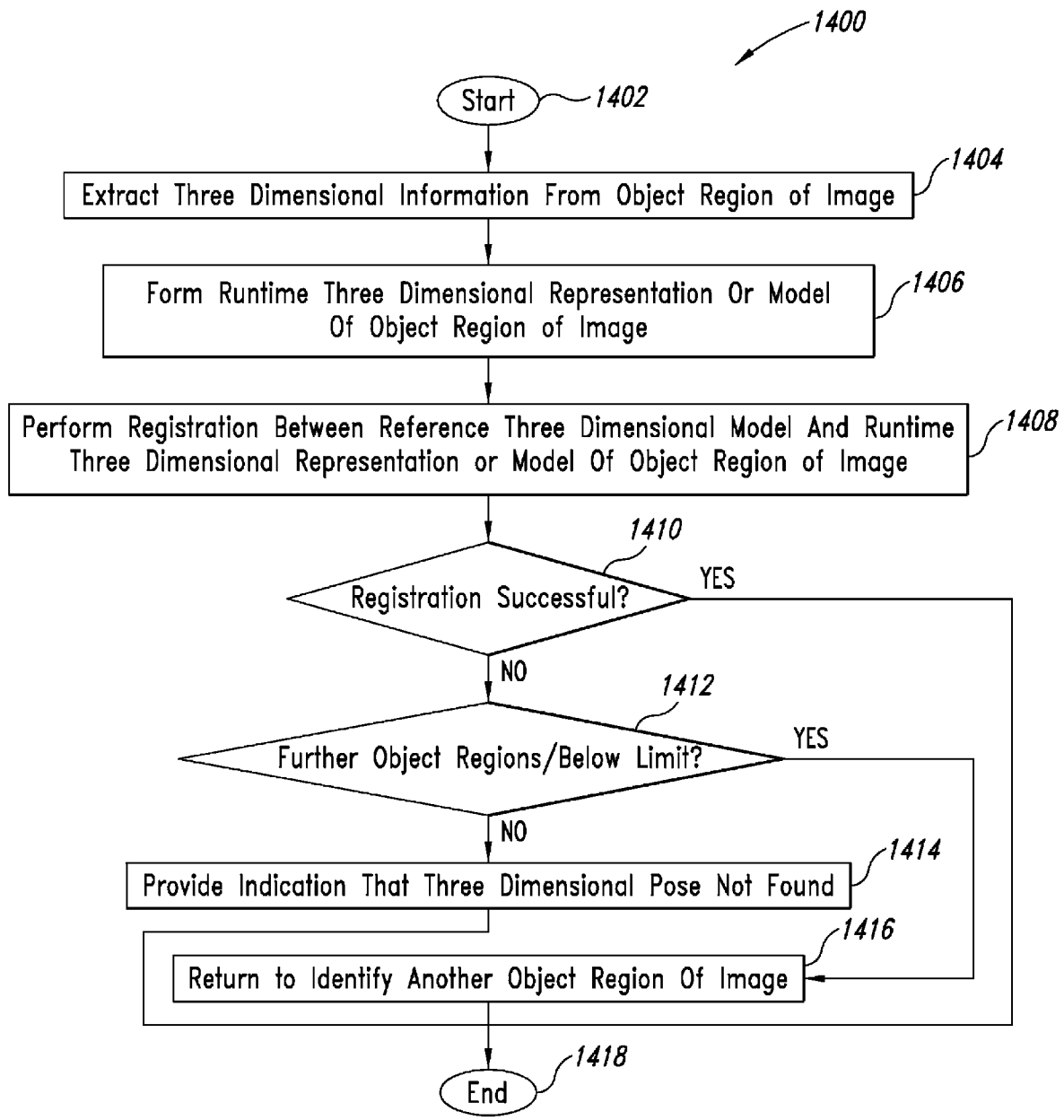
FIG. 14 is a flow diagram of a method of determining a three-dimensional pose estimation for the object according to one illustrated embodiment which includes performing a registration.

FIG. 14 shows a method 1400 of determining a three-dimensional pose estimation, according to one illustrated embodiment.

The method 1400 may be suitable for performing the act 1010 of method 1000 (FIG. 10).

The method 1400 starts at 1402, for example called as part of executing act 1010 of the method 1000.

At 1404, the machine-vision based system 100 extracts three-dimensional information from an object region, for example an object region identified at 1006 of the method 1000 (FIG. 10). For example, the machine-vision system 100 may determine the three-dimensional coordinates for some or all of the points in the object region.

At 1406, the machine-vision based system 100 forms a runtime three-dimensional representation or model of the object region of the image. The runtime three-dimensional representation or model may, for example, take the form of a three-dimensional point cloud of the object region of the image for all or some of the points in the object region.

At 1408, the machine-vision based system 100 performs registration between the reference three-dimensional model of the object region and the runtime three-dimensional representation or model of the object region of the image. FIG. 15 shows a method 1500 of performing registration according to one illustrated embodiment. The method 1500 may be suitable for performing the registration 1408 of method 1400 (FIG. 14). In particular, at 1502, the machine-vision based system 100 executes an error minimization algorithm to minimize an error between a reference three-dimensional model identified at 1008 of method 1000 (FIG. 10) and runtime three-dimensional model, for example by executing an iterative closest point algorithm.

In some embodiments, at least an approximate correspondence may be drawn between points in each of the reference three-dimensional models being compared. The correspondence may, for example, be based on a location where the runtime two-dimensional model is found and the stored relationship between the runtime two-dimensional model and the reference two-dimensional model. Additionally or alternatively, the approximate pose determined as a result of identifying an object region (e.g., 1006 of method 1000) may be used to initialize the comparison or registration process.

At 1410, the machine-vision based system 100 determines whether the registration is successful. If the registration is successful, the three-dimensional pose estimation has been found and control passes to 1418 where the method 1400 terminates. In some embodiments, the machine-vision based system 100 may provide a suitable indication regarding the found three-dimensional pose estimation before terminating at 1418. If the registration is unsuccessful, control passes to 1412.

At 1412, the machine-vision based system 100 determines whether there are further objects regions to be analyzed and/or whether a number of iterations or amount of time is below a defined limit. If there are no further object regions to be analyzed and/or if the number of iterations or amount of time is not below a defined limit control passes to 1414. At 1414, the machine-vision based system 100 provides a suitable indication that a three-dimensional pose estimation was not found, and the method 1400 terminates at 1418.

If there are further object regions to be analyzed and/or if the number of iterations or amount of time is below a defined limit control passes to 1416. At 1416, the machine-vision based system 100 may return to find another object region of the image to analyze or process, for example returning to 1006 of method 1000 (FIG. 10), the method 1400 terminating at 1418.

In the above-described various embodiments, the image capture device 114 was mounted on a member 116c of the sensor robotic system 116. In alternative embodiments, the image capture device 114 may be mounted on a portion of the robotic system 104 or mounted on a non-machine-vision based system, such as a track system, chain/pulley system or other suitable system. In other embodiments, a moveable mirror or the like may be adjustable to provide different views for a fixed image capture device 114.

In the above-described various embodiments, a plurality of images are successively captured as the image capture device 114 is moved until the pose of an object is determined. The process may end upon the robotic system 104 successfully manipulating one or more parts 110. In an alternative embodiment, the process of successively capturing a plurality of images, and the associated analysis of the image data, determination of three-dimensional pose estimates, and driving of the robotic system 104 continues until a time period expires, referred to as a cycle time or the like. The cycle time limits the amount of time that an embodiment may search for an object region of interest. In such situations, it is desirable to end the process, move the image capture device to the start position (or a different start position), and begin the process anew. That is, upon expiration of the cycle time, the process starts over or otherwise resets.

In other embodiments, if the three-dimensional pose estimation for one or more objects of interest are determined before expiration of the cycle time, the process of capturing images and analyzing captured image information continues so that other objects of interest are identified and/or their respective three-dimensional pose estimates determined. Then, after the current object of interest is engaged, the next object of interest has already been identified and/or its respective three-dimensional pose estimate determined before the start of the next cycle time. Or, the identified next object of interest may be directly engaged without the start of a new cycle time.

In the above-described various embodiments, the control system 106 (FIG. 1) may employ a microprocessor, a digital signal processor (DSP), an application specific integrated circuit (ASIC) and/or a drive board or circuitry, along with any associated memory, such as random access memory (RAM), read only memory (ROM), electrically erasable read only memory (EEPROM), or other memory device storing instructions to control operation.

The above description of illustrated embodiments, including what is described in the Abstract, is not intended to be exhaustive or to limit the invention to the precise forms disclosed. Although specific embodiments of and examples are described herein for illustrative purposes, various equivalent modifications can be made without departing from the spirit and scope of the invention, as will be recognized by those skilled in the relevant art. The teachings provided herein of the invention can be applied to other object recognition systems, not necessarily the exemplary machine-vision based system embodiments generally described above.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

For convenience, the various communications paths are illustrated as hardwire connections. However, one or more of the various paths may employ other communication media, such as, but not limited to, radio frequency (RF) media, optical media, fiber optic media, or any other suitable communication media.

In addition, those skilled in the art will appreciate that the control mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

These and other changes can be made to the present systems and methods in light of the above-detailed description. In general, in the following claims, the terms used should not be construed to limit the invention to the specific embodiments disclosed in the specification and the claims, but should be construed to include all power systems and methods that read in accordance with the claims. Accordingly, the invention is not limited by the disclosure, but instead its scope is to be determined entirely by the following claims.

The invention claimed is:

1. A method of object pose estimation using machine-vision, comprising:
   identifying an object region of an image on which pose estimation is being performed based on a correspondence between at least a portion of a representation of an object in the image and at least a corresponding one of a plurality of reference two-dimensional models of the object, the object region being a portion of the image that contains the representation of at least a portion of the object; and
   determining a three-dimensional pose of the object based on at least one of a plurality of reference three-dimensional models of the object and a runtime three-dimensional representation of the object region where a point-to-point relationship between the reference three-dimensional models of the object and the runtime three-dimensional representation of the object region is not necessarily previously known.

2. The method of claim 1 wherein identifying an object region of an image includes comparing each of a number of features in a digital representation of the image with a number of features in the corresponding one of the reference two-dimensional models.

3. The method of claim 2 wherein identifying an object region of an image includes comparing each of the number of features in the digital representation of the image to a number of features in successive ones of the reference two-dimensional models until a match is found within a defined tolerance or no match is found among all of the reference two-dimensional models of a set of the reference two-dimensional models.

4. The method of claim 3 wherein comparing a number of features in digital representation of the image to a number of features in successive ones of the reference two-dimensional models includes comparing a representation of at least one of an edge, a point, or an image patch in the digital representation of the image to a representation at least one of an edge, a point, or an image patch in the reference two-dimensional model.

5. The method of claim 1 wherein identifying an object region of an image includes computationally performing at least one of correlation based pattern matching, blob analysis, or geometric pattern matching.

6. The method of claim 1, further comprising:
   identifying the at least one of the plurality of reference three-dimensional models of the object based on the at least corresponding one of the reference two-dimensional models of the object.

7. The method of claim 6 wherein identifying at least one of the plurality of reference three-dimensional models of the object based on the at least corresponding one of the reference two-dimensional models of the object and a runtime three-dimensional representation of the object region where a point-to-point relationship between the reference three-dimensional models of the object and the runtime three-dimensional representation of the object region is not necessarily previously known includes identifying at least one of the reference three-dimensional models based on a stored relationship between the corresponding one of the reference two-dimensional models and the at least one of the reference three-dimensional models.

8. The method of claim 7 wherein determining a three-dimensional pose of the object based on at least one of a plurality of reference three-dimensional models of the object and a runtime three-dimensional representation of the object region where a point-to-point relationship between the reference three-dimensional models of the object and the runtime three-dimensional representation of the object region is not necessarily previously known includes performing a registration between the at least one of the reference three-dimensional models and a digital runtime three-dimensional representation of the object region of the image.

9. The method of claim 8 wherein the digital runtime three-dimensional representation of the object region of the image is a runtime three-dimensional model of the object region of the image and wherein performing a registration between the at least one of the reference three-dimensional models and a digital runtime three-dimensional representation of the object region of the image includes executing an error minimization algorithm to minimize error between the at least one of the reference three-dimensional models and the runtime three-dimensional model of the object region of the image.

10. The method of claim 9 wherein executing an error minimization algorithm includes executing an iterative closest point algorithm.

11. The method of claim 8, further comprising:
extracting three-dimensional information from the object region of the image.

12. The method of claim 11, further comprising:
forming the runtime three-dimensional model of the object region of the image from the runtime three-dimensional information extracted from the object region of the image.

13. The method of claim 8, further comprising:
providing an indication that the three-dimensional pose of the object has not been found if an outcome of the registration is unsuccessful.

14. The method of claim 1 wherein determining a three-dimensional pose of the object based on at least one of a plurality of reference three-dimensional models of the object and a runtime three-dimensional representation of the object region where a point-to-point relationship between the reference three-dimensional models of the object and the runtime three-dimensional representation of the object region is not necessarily previously known includes performing a registration between a set of dense three-dimensional data stored as the at least one reference three-dimensional model and a set of dense three-dimensional data stored as the runtime three-dimensional representation of the object region of the image.

15. The method of claim 1, further comprising:
capturing the image.

16. The method of claim 15 wherein the capturing an image, the identifying an object region of the image and the determining a three-dimensional pose of the object all occur during a runtime mode that follows a training mode.

17. The method of claim 16, further comprising:
acquiring the reference two-dimensional models during the training mode.

18. The method of claim 17 wherein acquiring the reference two-dimensional models during the training mode includes at least one of accessing an existing computer model of the object or sensing data from a representative object.

19. The method of claim 17, further comprising:
acquiring the reference three-dimensional models during the training mode.

20. The method of claim 19 wherein acquiring the reference three-dimensional models during the training mode includes acquiring information using at least one of a dense stereo sensor system, a laser triangulation system, a laser time of fight system or an ultrasound transducer.

21. The method of claim 19 wherein acquiring the reference three-dimensional models during the training mode includes identifying a portion of the image that contains a digital representation of at least part of the object.

22. The method of claim 21 wherein identifying a portion of the image that contains a digital representation of at least part of the object is performed either manually or automatically.

23. A non-transitory computer readable medium that stores instructions for causing a computer to perform object pose estimation using machine-vision, by:
identifying an object region of an image based on a correspondence between at least a portion of a representation of an object in the object region of the image and at least a corresponding one of a plurality of reference two-dimensional models of the object, the object region being a portion of the image that contains the representation of at least a portion of the object; and
determining a three-dimensional pose of the object based on at least one of a plurality of reference three-dimensional models of the object and a runtime three-dimensional representation of the object region where a point-to-point relationship between the reference three-dimensional models of the object and the runtime three-dimensional representation of the object region is not necessarily previously known.

24. The non-transitory computer readable medium of claim 23 wherein the instructions cause the computer to perform object pose estimation using machine-vision, further by:
extracting two-dimensional information from the object region of the image during a runtime to form a runtime two-dimensional digital model of the object region of the image.

25. The non-transitory computer readable medium of claim 24 wherein identifying an object region of an image includes comparing each of the number of features in the runtime two-dimensional digital model of the object region of the image to a number of features in successive ones of the reference two-dimensional models until a match within a defined tolerance is found or no match is found among all of the reference two-dimensional models of a set of the reference two-dimensional models.

26. The non-transitory computer readable medium of claim 24 wherein the instructions cause the computer to perform object pose estimation using machine-vision, further by:
extracting three-dimensional information from the object region of the image during the runtime to form a runtime three-dimensional model of the object region of the image.

27. The non-transitory computer readable medium of claim 26 wherein the instructions cause the computer to perform object pose estimation using machine-vision, further by:
identifying the at least one of the plurality of reference three-dimensional models of the object based on a stored relationship between the corresponding one of the reference two-dimensional models and the at least one of the reference three-dimensional models.

28. The non-transitory computer readable medium of claim 26 wherein determining a three-dimensional pose of the object based on at least one of a plurality of reference three-dimensional models of the object and a runtime three-dimensional representation of the object region where a point-to-point relationship between the reference three-dimensional models of the object and the runtime three-dimensional representation of the object region is not necessarily previously known includes performing a registration between the at least one of the reference three-dimensional models and the runtime three-dimensional model of the object region of the image.

29. The non-transitory computer readable medium of claim 23 wherein the identifying an object region of the image and the determining a three-dimensional pose of the object all occur during a runtime mode following a training mode.

30. The non-transitory computer readable medium of claim 29 wherein the instructions cause the computer to perform object pose estimation using machine-vision, further by:
  acquiring the reference two-dimensional models during the training mode; and
  acquiring the reference three-dimensional models during the training mode.

31. A system to perform three-dimensional pose estimation, the system comprising:
  at least one sensor;
  at least one processor; and
  at least one memory storing processor executable instructions that cause the at least one processor to segment an image captured by the at least one sensor into a number of object regions based at least in part on a correspondence between at least a portion of a representation of an object in the object region of the image and at least a corresponding one of a plurality of reference two-dimensional models of the object and to cause the at least one processor to determine a three-dimensional pose of the object based on at least one of a plurality of reference three-dimensional models of the object that is related to the corresponding one of the plurality of reference two-dimensional models of the object and a runtime three-dimensional representation of the object region where a point-to-point relationship between the reference three-dimensional models of the object and the runtime three-dimensional representation of the object region is not necessarily previously known.

32. The system of claim 31 wherein the instructions further cause at least one processor to identify the at least one of the plurality of reference three-dimensional models of the object based on a set of stored relationships between a plurality of reference two-dimensional models and the plurality of reference three-dimensional models of the object.

33. The system of claim 31 wherein the at least one sensor includes at least one of an imager mounted for movement, a stereo pair of cameras, and a laser.

34. The system of claim 31 wherein the at least one sensor includes at least one imager mounted for movement with respect to the object.

35. The system of claim 31 wherein the at least one sensor includes at least one imager and at least one of a laser or a set of structured lighting.

36. The system of claim 31 wherein the at least one sensor includes at least one stereo pair of cameras.

37. The system of claim 31 wherein the instructions further cause the at least one processor to provide drive signals to drive a robotic member based on the determined three-dimensional pose estimation.

* * * * *